July 4, 1967
T. J. DUNN
3,329,225
VEHICLE WITH SELECTIVELY CHANGEABLE WORK IMPLEMENTS
Filed Dec. 9, 1964
8 Sheets-Sheet 2
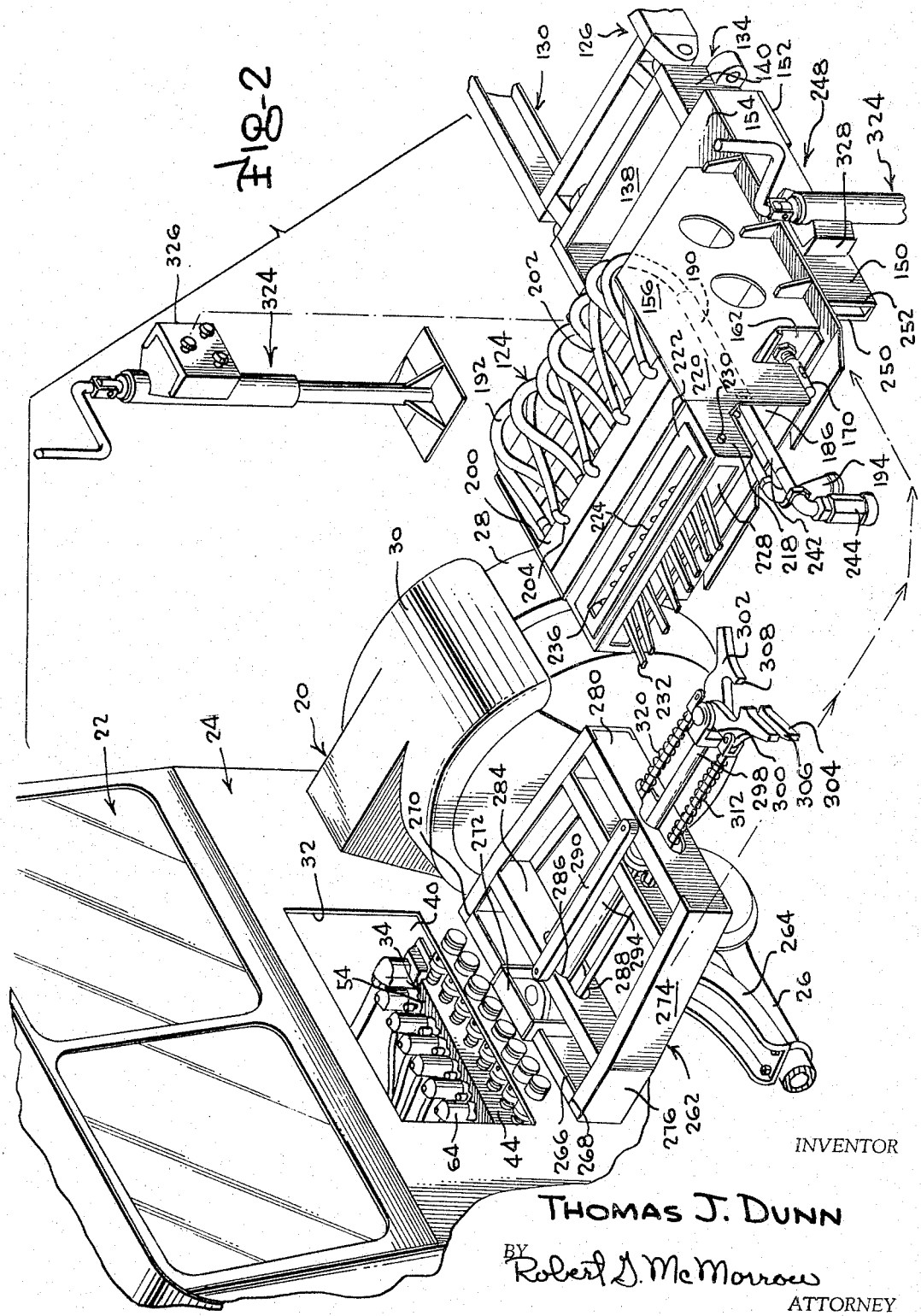
INVENTOR
THOMAS J. DUNN
BY Robert G. McMorrow
ATTORNEY

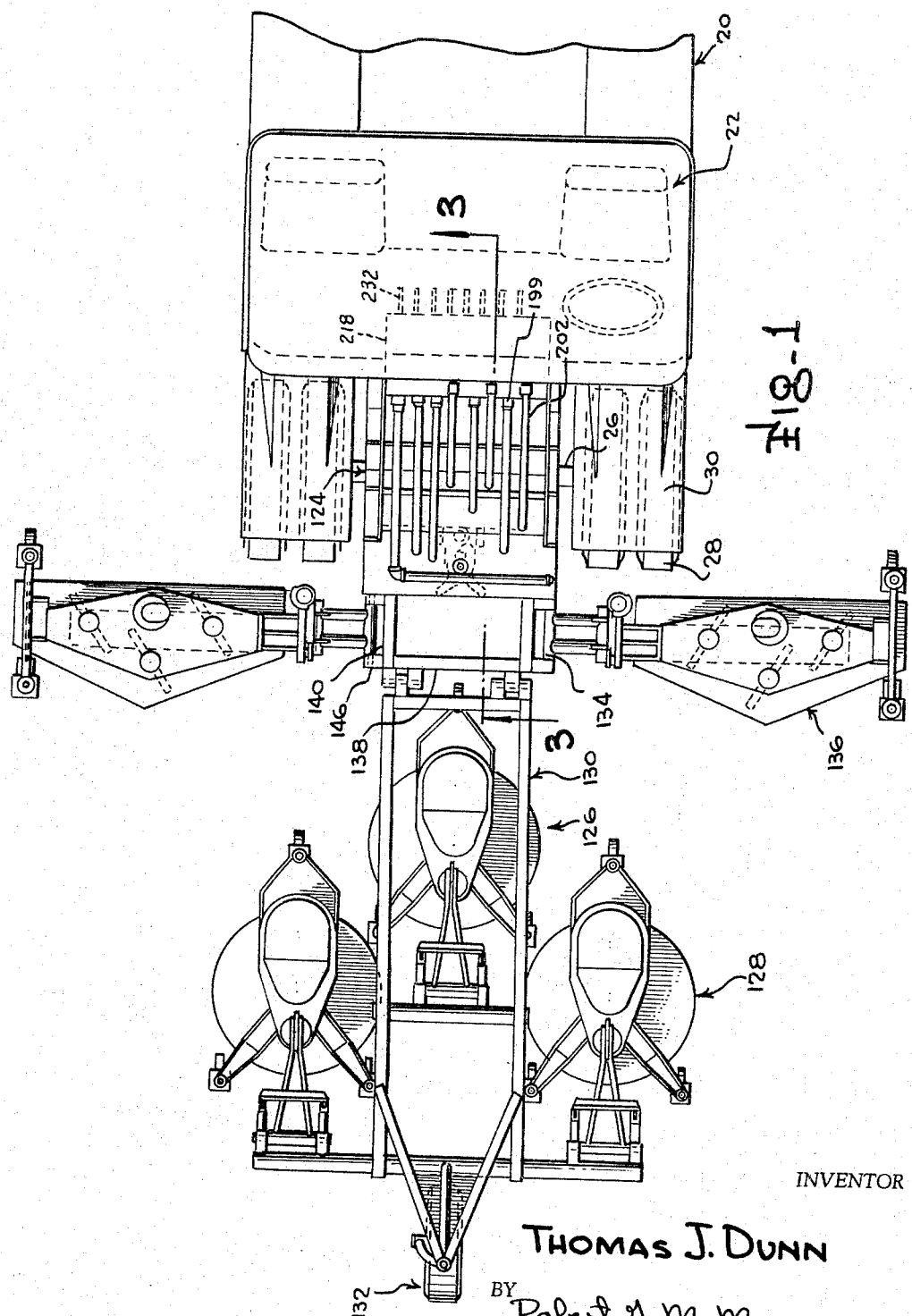

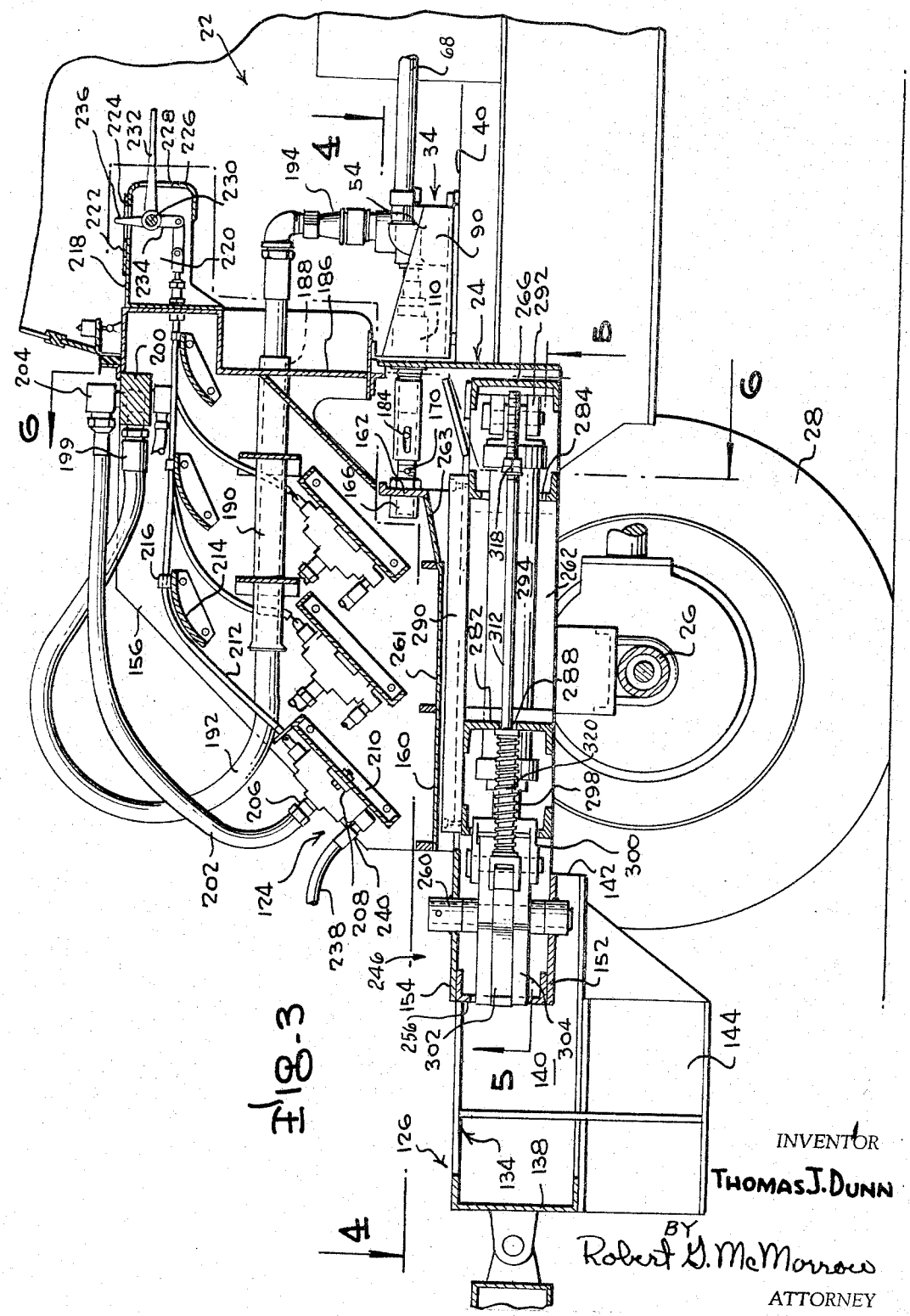

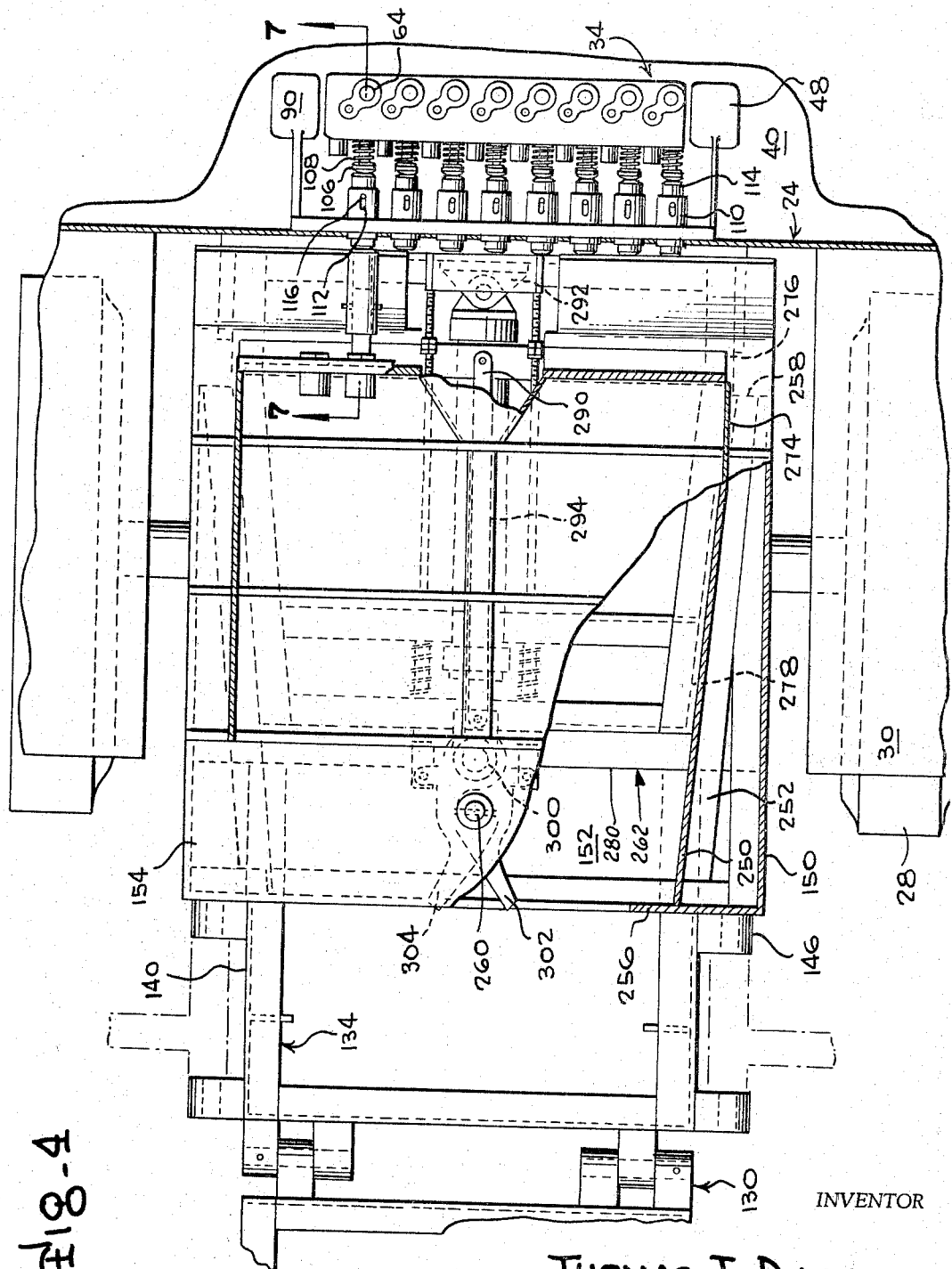

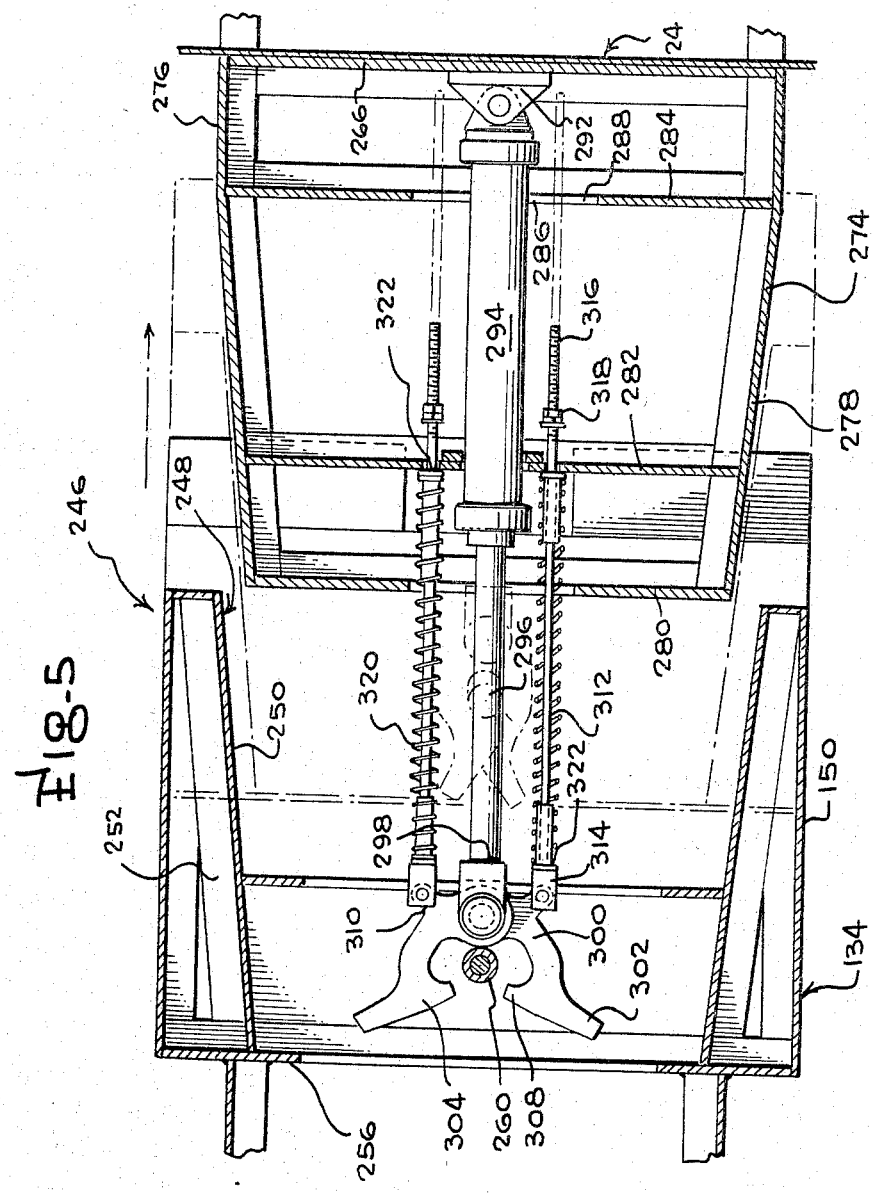

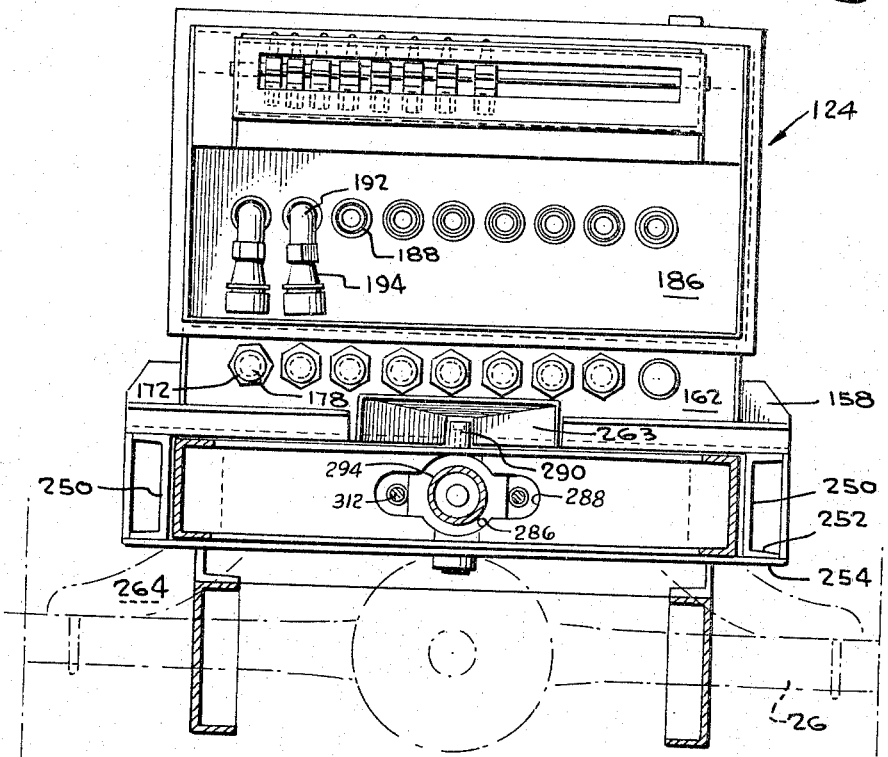
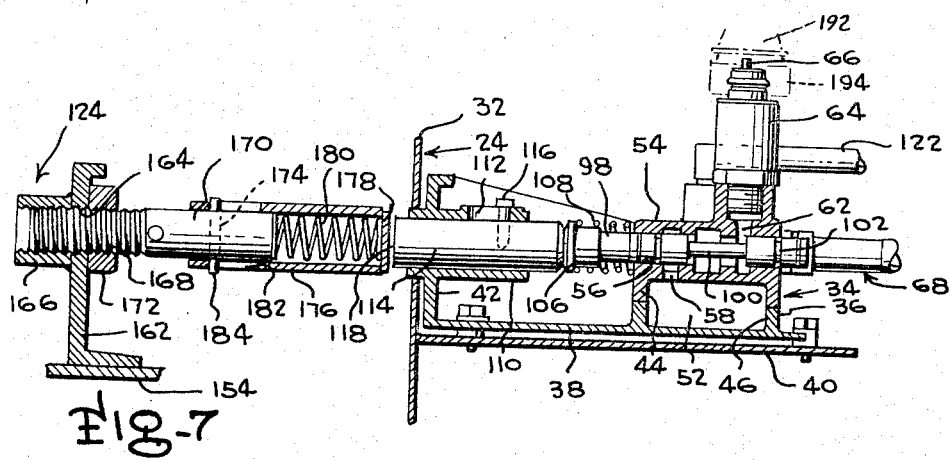

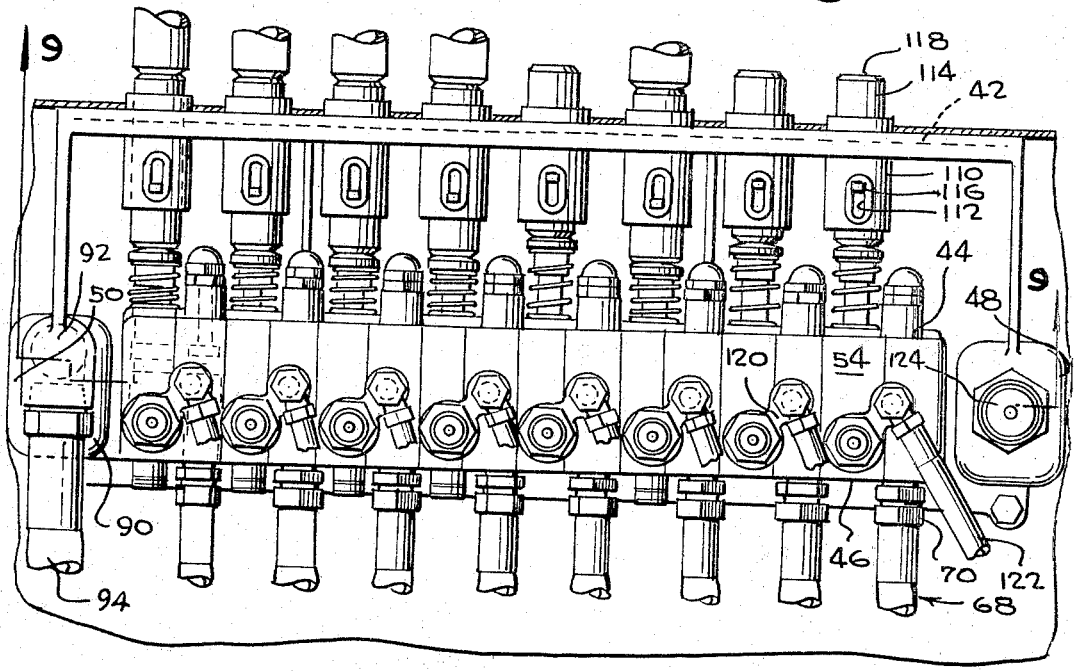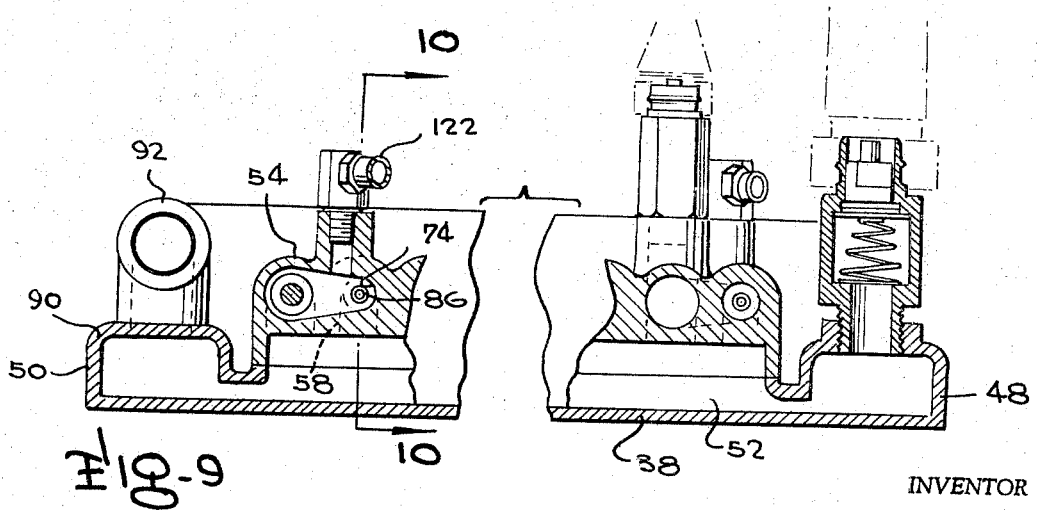

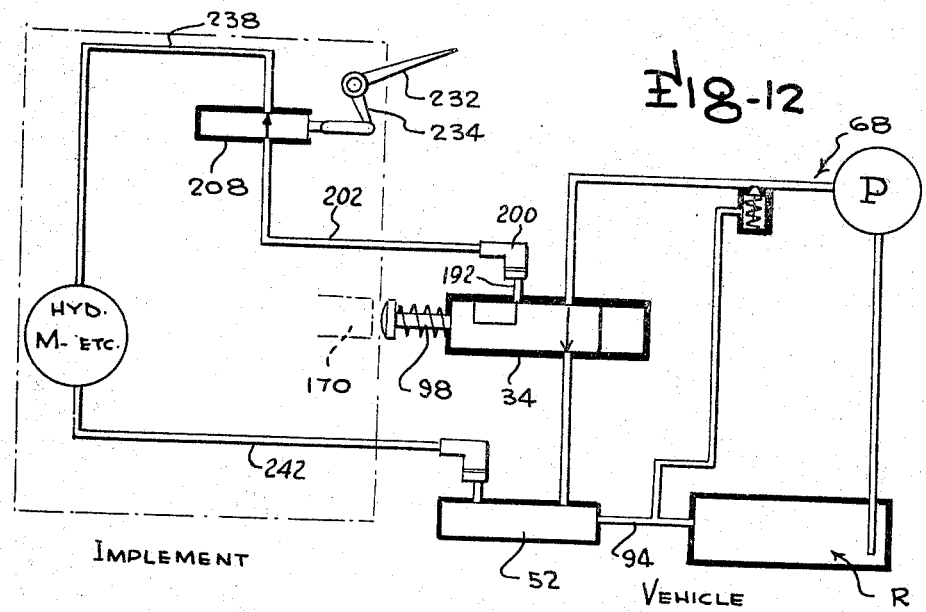
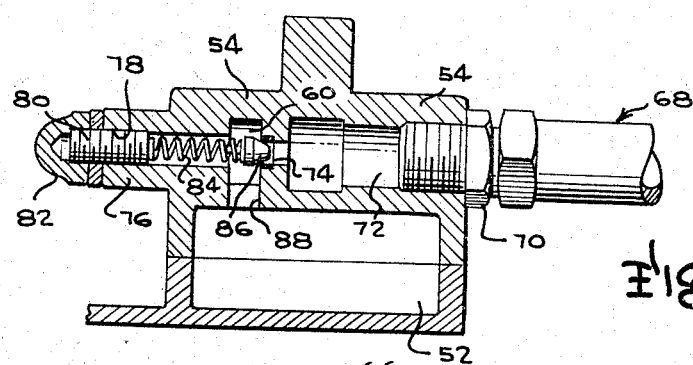
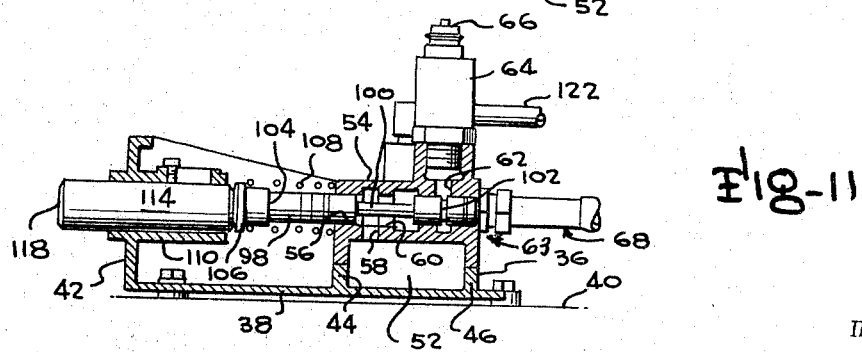

United States Patent Office 3,329,225
Patented July 4, 1967

3,329,225
VEHICLE WITH SELECTIVELY CHANGEABLE
WORK IMPLEMENTS
Thomas J. Dunn, 600 E. Valley Ave.,
Hackettstown, N.J. 07840
Filed Dec. 9, 1964, Ser. No. 417,167
14 Claims. (Cl. 180—1)

ABSTRACT OF THE DISCLOSURE

A prime mover and changeable work implements therefor, the prime mover having a power distribution manifold and the implements having consoles for engagement with the manifold for power transfer, the inter-engagement of the console and the manifold actuating compression controls thereof.

This invention relates to a prime mover and work implements adapted for use with the prime mover. The work implements are of the class employed in the maintenance of highways, highway median strips and sidings, and related types of activity, including, without limitation, mowing apparatus, snow removal equipment, and sweeping equipment.

It is a primary objective of the present invention to provide a single prime mover and plural, seasonally employed, attachments therefor of the class mentioned above, thereby adapting the more costly prime mover and power source to substantially year around operation. At present much of the available mowing, sweeping and snow removal equipment is self-contained, and hence, the power source and prime mover portions are out of service seasonally. The present invention provides a prime mover and multiple work implements for use therewith, the implements being quickly and readily attached to or detached from the prime mover, and the implement receiving power from the prime mover. Related objects and advantages center about the provision of a novel connection and power supply means whereby the prime mover and a work implement are connected to one another and an effective service connection therebetween is established. This service connection is arranged such that there is an operative establishment of a selected number of connections within a given range, responsive to the varied requirements of different implements, so that, for example, if a given implement requires two connections with the power source of the prime mover, two connections are completed by attachment of the prime mover and the implement.

An additional object of importance herein involves the provision of new and novel hitch means between a prime mover and a work implement. Related to this objective is that of providing a hitch which is substantially self-aligning, one controlled chiefly from the prime mover, and one adapted for use in conjunction with the service connections hereof.

Another objective is to supply a highway service vehicle in the nature of a prime mover, the vehicle providing a comfortable operator cab enclosure, and the hitch and service connection being operated from within the enclosure. This arrangement of the service connection and cab enclosure is such that access to, and control of, the service connection is mainly from within the cab.

Numerous additional objects and advantages will be made apparent to those skilled in the art upon consideration of the following specification, when read in conjunction with the annexed drawings, in which:

FIGURE 1 is a top plan view of a typical work implement hereof, mounted forwardly of a prime mover constructed and assembled in accordance with the teachings of this invention, the prime mover being partially broken away;

FIGURE 2 is a fragmentary, enlarged, disassembled perspective view of the prime mover and implement;

FIGURE 3 is an enlarged vertical cross sectional view, taken substantially on the line 3—3 of FIGURE 1, looking in the direction of the arrows;

FIGURE 4 is a top plan view of the hitch hereof, partially in cross section along the line 4—4 of FIGURE 3, looking in the direction of the arrows;

FIGURE 5 is a sectional view of a portion of the hitch in maximum extended position, taken substantially on the line 5—5 of FIGURE 3, looking in the direction of the arrows;

FIGURE 6 is a vertical, transverse sectional view on the line 6—6 of FIGURE 3, looking in the direction of the arrows;

FIGURE 7 is an enlarged, detail section through a compression actuated control means hereof, taken on the line 7—7 of FIGURE 4, looking in the direction of the arrows;

FIGURE 8 is an enlarged top view of a manifold assembly forming a part of the service connection hereof;

FIGURE 9 is an enlarged, foreshortened sectional view, showing details, taken on line 9—9 of FIGURE 8, looking in the direction of the arrows;

FIGURE 10 is a detail section on the line 10—10 of FIGURE 9;

FIGURE 11 is a sectional view showing one of the elements of FIGURE 7 in a closed or by-pass position; and FIGURE 12 is a diagrammatic showing of a typical hydraulic circuit hereof.

Referring to the drawings in greater detail, designated at 20 in FIGURES 1-3 is a mobile prime mover or work vehicle having a cab 22 with a forward wall 24. A drive axle 26 is mounted forwardly of the wall 24, and has tandem wheels 28 thereon, fenders 30 covering the wheels. The prime mover has mounted thereon a hydraulic supply source, including a pump P and reservoir R, shown diagrammatically in FIGURE 12. As best shown in FIGURE 2, the cab forward wall 24 has a substantially rectangular access port 32 formed therein, and the port may be supplied with a detachable cover (not shown) for use when no implement is connected to the vehicle.

A power supply manifold 34 is mounted on the prime mover 30. The manifold 34 comprises an elongated body portion 36 having a base 38 secured to the cab floor 40, a forward wall 42 adjacent and substantially parallel to the cab wall 24, and chamber walls 44, 46 with ends 48 and 50 defining a main fluid sump or chamber 52. The chamber top includes a cast or otherwise formed member 54 with a plurality of compound passageways therein. With specific reference to FIGURES 7, 9 and 11, it will be noted therein that the compound passageways of the top 54 include a forward opening 56, communicating with a vertical passageway 58 to the chamber 52, an intermediate by-pass aperture 60, and a top opening 62 to discharge means. The discharge means individually comprise spool-type valve assemblies 63 with outlet fittings 64 secured in the openings 62 and having top discharge portions 66.

In FIGURES 8, 9 and 10, the fluid supply means for the manifold is shown, including a plurality of conduits 68 from the pump P each having a fitting 70 at its end. The manifold member 54 has openings 72 therein to receive the fittings and has reduced inner seats 74. Forwardly of, and aligned with, the seats 74 are bosses 76 with openings 78 therein. A screw 80 with cover nut 82 is mounted in each opening 78, and maintains a coil spring 84 of selected tension in place to bias a plug 86 to close against the seat 74. Tension of the spring 84 is such that the plug 86 is readily unseated upon the imposition of fluid pressure thereagainst from the conduit 68. As best shown in FIGURE 10, the seat portions 74 communicate with the transverse by-pass apertures 60 and are open at 88 to the sump 52.

Referring to FIGURES 8 and 9, it is seen that the manifold has an enlarged housing 90 at one end with a fitting 92. Connected to the fitting 92 is a return line conduit 94 leading to the reservoir R. Thus, during operation, fluid is moved from the sump 52, into the housing 90, through the fitting 92 and conduit 94 to the reservoir.

The manifold 34 provides a means for the selective employment of the hydraulic power source with variant implements with differing circuit requirements. To provide only the required number and arrangement of circuits from the manifold, each outlet fitting 64 is individually controlled, the control being effected by connection of the vehicle and implement. Control means for each fitting 64 comprises the valve assembly 63 which includes an elongated piston 98, having a reduced diameter central portion 100 and inner and outer ends 102, 104, reciprocally mounted in the compound passageway including the opening 56 and aperture 60. The outer end 104 has an enlarged cap 106 thereon and a spring 108 is retained by the cap and bears against the member 54. The action of the spring 108 constantly urges the piston 98 outwardly, in which outward position (FIGURE 11), the reduced portion 100 extends across the by-pass aperture 60. Thus, fluid supplied from the pumps P through conduits 68 and into the manifold is passed into the sump 52 and back through the fitting 92 and conduit 94 to the reservoir R.

The forward wall 42 of the manifold has a plurality of sleeves 110 formed integrally therewith, each having a slot 112 in its upper side, and the sleeves are individually aligned with the pistons 98. An abutment plug or index element 114 of substantially cylindrical form is mounted slidably in each sleeve and has a vertical limit pin 116 projecting upwardly through the slot 112 to restrict its forward and rearward movement. The plug has an outer end 118 which etxends outwardly of the sleeve and through a coaligned opening in the cab wall 24. Upon the application of an inward force to the plug (described in detail below), the piston 98 is moved inwardly blocking the by-pass 60 and establishing a fluid communication between the intake opening 72 and vertical passageway 62 to permit fluid flow to the fitting 64.

It is desirable that each fitting have a side passage 120 connected to a conduit 122 leading to individual pressure gauges (not shown), thus permitting cessation of operation in the event of overload.

Coacting with the manifold 34 on the prime mover 20 is an attachment console 124 of a typical work implement 126 hereof. The implement, in the illustrated embodiment, comprises an adaptation of the hydraulically actuated mowing apparatus disclosed in my prior U.S. Patent No. 3,135,079, including wheeled gang units 128 on a frame 130 with a trailing main caster 132. Frame 130 is secured to a forward frame 134 with laterally mounted, wheeled mowers 136. Each mowing unit may be provided with lift means (not shown) so that the mower may be lifted for transport of the apparatus. The console 124 for each implement has connection means corresponding to the hydraulic requirements of the implements.

As shown in FIGURE 3, the forward frame 134 includes a forward member 138, sides 140 and back end 142. A depending section 144 has sleeves 146 to support the side mowers 136. Secured to the forward frame 134 is an open hitch frame 148 having side members 150, a transverse front support plate 152 and an overlying top plate 154. Plate 154 serves as a base for the mounting of the console 124.

The console comprises opposite side walls 156 secured on the base 154 and having reinforcing gussets 158. An interior spacing member 160 connects the side walls. As shown in FIGURES 2, 3, 6 and 7, an actuator support bar 162 extends across the forward sides of the walls 156 and is secured to the base 154. The bar 162 has a row of threaded openings 164 formed therein with aligned threaded boss members 166 connected to the rear side thereof as by welding, receiving the threaded shank portions 168 of substantially cylindrical abutment members or index points 170. The abutment members 170 are positioned by lock nuts 172 and have transverse passages 174 formed therein. A tubular contact member 176 with a closed outer end 178 is journaled on each abutment member 170 and has a shock reduction spring 180 encased therein. The member 176 is longitudinally slotted at 182 on each side and a pin 184 is extended through the slots and through the passages 174 to lock the contact member on the abutment. As best shown in FIGURE 7, the ends 178 of the contact members are adapted for alignment with ends 118 of the plugs 114 and upon compression of the springs 180 to a predetermined extent (less than full compression to compensate for manufacturing tolerances and to prevent possible valve damage) cause inward displacement of the plugs 114 with consequent opening of a fluid circuit corresponding thereto.

A console back wall 186 is spaced upwardly and rearwardly of the bar 162 and has a row of openings 188 formed therein in generally vertical alignment with the abutments 170. An elongated, rigid tube 190 is mounted in each opening 188 and supports a flexible hose 192. The hoses 192 carry couplings 194 comprising normally closed output coupling spools on their outer ends which are for connection with the spool-type valves 64 on the manifold. The opposite ends of the hoses have fittings 199 connected to a fitting block 200 extending between the walls 156 at the upper sides thereof. Second flexible hoses 202 are connected to the block 200 at fittings 204 and are in fluid communication with the hoses 192 through the block. Fittings 206 of the hoses 202 are connected to distributor bodies 208 mounted on plural cross panels 210 extended between the side walls 156. A control cable 212 is operatively associated with each distributor body 208 for opening or closing of fluid flow therethrough. Arcuate cable supports 214 extend between the side walls and have cable guides 216 thereon through which the cables extend into a control lever housing 218. The housing 218 is mounted rearwardly of the console and extends into the cab 22 when the vehicle and implement are operational, and includes sides 220, a top 222 with a transversely elongated slot 224 therein, and a rear side 226 slotted transversely at 228. As best shown in FIGURE 3, a rod 230 extends between the sides 220 of the lever housing, and a plurality of L-shaped levers having elongated operating arms 232 which project through the slot 228 and into the cab are provided, each including perpendicularly related arms 234 which are pivotally mounted on the bar—there being a lever for each cable 212. The levers further include upright signal members 236 which extend through the slot 224 to visually shown the position of the lever. The levers provide a manual control and visual indication of the fluid supply for each circuit to the implement, independent of the automatic opening occasioned by contact of the abutments and abutment plugs. The levers are positioned within the cab, thereby giving the operator readily accessible control over each circuit. The construction of the distributor bodies 208 permits manual closing of fluid passage therethrough upon downward movement of the levers. Hoses 238 are connected at fittings 240 to each body and the hoses extend to the implement motors M—shown only in FIGURE 12.

One of the circuits comprises a return line 242 (FIG-

URE 2), with a connection fitting 244 releasably secured to the end 48 of the manifold 34 for fluid return.

From the foregoing and as indicated in the drawings, it will be seen that an effective power circuit is established by connection of the vehicle and implement. While a preferred hydraulic means of power supply is shown and described, it will be understood that an electrical circuit could be likewise established without departure from the spirit of the invention, as well as other power supply connections. The number of circuits established corresponds to and is controlled by the supply requirements of the implement.

Coacting with the service connection between the manifold of the prime mover and the implement console is a new and novel hitch means hereof. The hitch 246 includes an open frame 248 on the console 124, mounted in the forward frame 134 thereof. The open frame has sides 250 of channel form with legs 252 connected to the console base 154 and to a frame base 254 (FIGURE 6). As best seen in FIGURE 5, the sides 250 are positioned closer to one another at the front wall 256 of the frame than at their terminal ends 258 whereby the sides 250 and the console base 154 provide a forwardly opening guideway.

A vertical pin 260 is fixed to extend between the base 154 and the front support plate 152 at a location spaced inwardly from the front wall 256, and the pin 260 is substantially centrally located between the sides 250.

A central guide housing 261, struck upwardly from the spacing member 160 has a vertically and upwardly flared mouth 263 best shown in FIGURE 6.

An elongated, tapered hitch frame 262 extends from the cab wall 24 between the fenders 30 and is supported on the axle 26 by a bracket 264. The frame has a substantially rectangular back brace 266 secured to the wall 24, the brace having ends 268, 270 and a central, open box portion 272. Side bars 274 of channel stock extend outwardly from each of the ends and have perpendicular sections 276, and inwardly angled sections 278 adapted for engagement against the open frame sides 250. A forward cross piece 280 and intermediate cross piece 282, 284 connect the frame sides 274, and each cross piece has a substantially centrally located opening therein with an enlarged central portion 286 and side section 288.

A guide bar 290 extends along the top of the frame 262, and is engageable in the guide housing 261, as appears in more detail below.

A clevis 292 is mounted within the box portion 272, and a hydraulic cylinder 294 is pivotally secured thereto. The cylinder includes an extensible portion 296 and is connected to the power source and to a control within the vehicle (not shown). At its distal end 298 the portion 296 has a clevis number 300 thereon.

A pair of interlocking jaws 302 and 304 are pivotally mounted on the clevis 300. As shown, the jaw 304 is bifurcated at 306 to receive an extended tooth 308 of the jaw 302 whereby the jaws may be interlocked about the upright pin 260. Each of the jaws has an apertured boss 310 thereon. An elongated rod 312 is secured at one end 314 to each boss and the rods extend through the opening portions 288. The opposite ends 316 of the rods are threaded and have stop nuts 318 adjustably positioned thereon. Springs 320 are coiled about each rod and maintained thereon by slidable collars 322.

The cylinder 294 is controlled from within the cab 22, and the fluid connection thereto is not specifically shown—being of conventional type. As shown in FIGURE 5, the extension of the portion 296 controls the opening of the jaws 302, 304. Both the portion 296 and the rods 312 are extensible together, but the rods 312 are extensible to a maximum forward position relative to the frame forward cross piece 280 which is less than the maximum forward extended position of the end 298 of the extensible portion 296. These elements are shown in FIGURE 5 in their respective maximum forward positions. As the portion 296 continues past the maximum extension of the rods, the rods being connected to the pivotally mounted jaws 302, 304, cause opening thereof when the portion 296 is full extended. As the distance between the jaws and the cross piece 280 is reduced however, the springs exert an opposite force, causing the jaws to close.

In the establishment of a connection between the vehicle and a selected implement, the frames 248 and 262 are first aligned. In the illustrated form of the invention, this is accomplished, when necessary, by employing a jack means, such as manual crank jacks 324 to raise the implement hitch 246. The jacks carry brackets 326 adapted for detachable connection with brackets 328 on the sides 150 of the forward implement frame.

After general alignment of the frames through use of the jacks, the operator retracts the cylinder portion 296 to maximum inward position. The vehicle is then driven against the implement, the frame 262 entering the frame 248 and the guide bar 290 engaging in the guide housing 261, to a predetermined point. At this point, the cylinder is extended to such position as to cause the jaws 302 and 304 to contact the pin 260. The extension continues and the jaws 302 and 304 are snapped about the pin 260 as shown in FIGURE 5 and close thereabout with an audible click whereupon extension is halted. The portion 296 is then retracted to almost the point of contact between the connection actuation means. At this point, the hoses are connected to appropriate couplings, and thereafter, the closing continues to the fully hitched position shown in phantom lines in FIGURE 5.

In the last named position, the abutment plugs 114 and contact members 176 have contacted one another and activated the service connection as outlined above, the operator depressing selected levers 232 to commence implement operation. Suitable indication means is provided within the cab to signal the portion of tool travel during which the quick coupler can be attached without encountering hydraulic fluid under pressure.

Having described and illustrated one embodiment of this invention in some detail, it will be understood that this description and illustration is offered merely by way of example, and that the invention is to be limited in scope only by the appended claims.

What is claimed is:

1. In a prime mover and work implement, the work implement having individually operated units, the prime mover having a cab and having a fluid power source, connection and power supply means comprising:
 a fluid pressure supply manifold mounted within the cab and arranged to receive pressurized fluid from the power source;
 a plurality of outlet supply fittings on the manifold;
 valve rods extending through the manifold to normally block fluid flow to the fittings in a first position and movable to second fluid communicating positions, with valve rods corresponding to the fittings;
 hitch means connecting the prime mover and implement;
 an attachment console on the implement having abutment means thereon for movement of the valve rods to said second positions on contact therewith;
 fluid conduits extending from the console and connected to the fittings, the conduits corresponding to the units of the implement the fluid conduits receiving pressurized fluid from the power source through the fittings; and
 control means for instituting and ceasing implement operation extending into the cab associate with each conduit.

2. The invention of claim 1, wherein:
 the control means include manual levers; and
 indicia means indicating lever position 3. The invention of claim 1, wherein:
 the hitch means includes a hitch frame extended outwardly from the prime mover;

an extensible hitch secured to the hitch frame;
interlocking jaws on the extensible hitch opened responsive to extension thereof;
an open frame on the console receiving the hitch frame; and
a pin in the open frame engaged by the jaws.

4. The invention of claim 3, wherein;
the hitch frame has an elongated guide bar thereon; and
the open frame has a bar housing thereon to provide a guide channel for the bar.

5. In a prime mover and an interchangeable work implement powered by the prime mover, the implement including work units with hydraulic motors, the prime mover having a cab with a forward wall having an access port formed therein, the prime mover having an axle mounted ahead of the forward wall, and a hydraulic supply source on the prime mover, connection and power supply means comprising:
   a fluid pressure supply manifold mounted within the cab adjacent the access port of the forward wall, the manifold including a plurality of fluid transfer assemblies each having a fluid intake connected to the hydraulic source and plural, normally closed output coupling spools;
   compression actuated controls for each of the fluid transfer assemblies projecting outwardly of the manifold, the controls including valve closures to block the respective fluid transfer assemblies in one position and being movable away from such position;
   an attachment console mounted on the implement;
   a plurality of flexible fluid conduits mounted on the attachment console and connected at one end to the motors of the implement units and having clamps at their other ends for releasable connection with the spools of the supply manifold;
   a plurality of abutments on the implement console to compress the controls for the fluid transfer means, the abutments corresponding to the fluid conduits;
   a flexible fluid return line extending between the console and the manifold;
   a control lever on the console to selectively open and close the fluid transmission for each fluid conduit of the implement;
   hitch means connecting the prime mover and implement; and
   the console projecting into the cab with the prime mover and implement in hitched position.

6. The invention of claim 5, wherein:
   the hitch means includes an extensible and retractable hitch; and
   a pin on the implement engaged by the hitch.

7. In a prime mover and an interchangeable work implement powered by the prime mover, the implement including work units with hydraulic motors, the prime mover having a cab with a forward wall having an access port formed therein, and a hydraulic supply source on the prime mover, connection and power supply means comprising:
   a fluid pressure supply manifold mounted within the cab adjacent the access port of the forward wall, the manifold including a plurality of fluid transfer assemblies each having a fluid intake connected to the hydraulic source and plural, normally closed output coupling spools;
   compression actuated controls for each of the fluid transfer assemblies projecting outwardly of the manifold, the controls including valve closures to block the respective fluid transfer assemblies in one position and being movable away from such position;
   an elongated, tapered hitch frame projecting from the cab forward wall, the hitch frame including a forward cross piece with an opening formed therein;
   an extensible and retractable bar extending through the opening of the forward side and having a clevis member at its outer end, the bar being extensible to a selected maximum position relative to the frame;
   an extensible and retractable rod on each side of the bar, the rods being extensible with the bar to maximum forward positions less than said maximum forward position of the bar;
   the bar having pivotal jaws on the clevis member and the rods being pivotally secured to the jaws to effect opening of the jaws upon extension of the bar to said maximum forward position;
   an attachment console mounted on the implement;
   a plurality of flexible fluid conduits mounted on the attachment console and connected at one end to the motors of the implement units and having clamps at their other ends for releasable connection with the spools of the supply manifold;
   a plurality of abutments on the implement console to compress the controls for the fluid transfer assemblies, the abutments corresponding to the fluid conduits;
   a flexible fluid return line extending between the console and the manifold;
   a control lever on the console to selectively open and close the fluid transmission for each fluid conduit of the implement; and
   the console projecting into the cab with the control levers disposed therein.

8. In a prime mover and an interchangeable work implement powered by the prime mover, the implement including work units with hydraulic motors, the prime mover having a cab with a forward wall having an access port formed therein, and a hydraulic supply source on the prime mover, connection and power supply means comprising:
   a fluid pressure supply manifold mounted within the cab adjacent the access port of the forward wall, the manifold including a plurality of fluid transfer assemblies each having a fluid intake connected to the hydraulic source and plural, normally closed output coupling spools;
   compression actuated controls for each of the fluid transfer assemblies projecting outwardly of the manifold, the controls including valve closures to block the respective fluid transfer assemblies in one position and being movable away from such position;
   an elongated, tapered hitch frame projecting from the cab forward wall, the hitch frame including a forward side with an opening formed therein;
   an extensible and retractable bar extending through the opening of the forward side and having a clevis member at its outer end, the bar being extensible to a selected maximum position relative to the frame;
   an extensible and retractable rod on each side of the bar, the rods being extensible with the bar to maximum forward positions less than said maximum forward position of the bar;
   a pair of interlocking jaws pivotally secured to the clevis member, and respectively pivotally secured to the rods, the jaws being in closed, interlocked positions in all but the maximum forward positions of the bar and the rods being open in said maximum positions;
   an attachment console mounted on the implement;
   an open frame on the console receiving the tapered hitch, the open frame having inner and outer ends;
   a fixed pin secured in the frame adjacent the inner end thereof and engaged by the jaws of the hitch;
   a plurality of flexible fluid conduits mounted on the attachment console and connected at one end to the motors of the implement units and having clamps at their other ends for releasable connection with the spools of the supply manifold;
   a plurality of abutments on the implement console to compress the controls for the fluid transfer means, the abutments corresponding to the fluid conduits;

a flexible fluid return line extending between the console and the manifold;
a control lever on the console to selectively open and close the fluid transmission for each fluid conduit of the implement; and
the console projecting into the cab with the hitch frame received within the open console frame.

9. In a prime mover and an interchangeable work implement powered by the prime mover, the implement including work units with hydraulic motors, the prime mover having a cab with a forward wall having an access port formed therein, the prime mover having an axle mounted ahead of the forward wall, and a hydraulic supply source on the prime mover, connection and power supply means comprising:
a fluid pressure supply manifold mounted within the cab adjacent the access port of the forward wall, the manifold including a plurality of fluid transfer assemblies each having a fluid intake connected to the hydraulic source and plural, normally closed output coupling spools;
compression actuated controls for each of the fluid transfer assemblies projecting outwardly of the manifold, the controls including valve closures to block the respective fluid transfer assemblies in one position and being movable away from such position;
an elongated, tapered hitch frame projecting from the cab forward wall over the axle and being supported thereon, the hitch frame including a forward side with an opening formed therein;
an extensible and retractable bar extending through the opening of the forward side and having a clevis member at its outer end, the bar being extensible to a selected maximum position relative to the frame;
an extensible and retractable rod on each side of the bar, the rods being extensible with the bar to maximum forward positions less than said maximum forward position of the bar;
a pair of interlocking jaws pivotally secured to the clevis member, and respectively pivotally secured to the rods, the jaws being in closed, interlocked positions in all but the maximum forward positions of the bar and the rods being open in said maximum positions;
an attachment console mounted on the implement;
an open frame on the console receiving the tapered hitch, the open frame having inner and outer ends;
a fixed pin secured in the frame adjacent the inner end thereof and engaged by the jaws of the hitch;
a plurality of flexible fluid conduits mounted on the attachment console and connected at one end to the motors of the implement units and having clamps at their other ends for releasable connection with the spools of the supply manifold;
a plurality of abutments on the implement console to compress the controls for the fluid transfer means, the abutments corresponding to the fluid conduits;
a flexible fluid return line extending between the console and the manifold;
a control lever on the console to selectively open and close the fluid transmission for each fluid conduit of the implement; and
the console projecting into the cab with the hitch frame received within the open console frame.

10. In a prime mover and detachable work implement, the implement including work units with hydraulic motors, the prime mover having a cab, the cab having an access port thereto, and a hydraulic supply source on the prime mover, connection and power supply means comprising:
a fluid pressure supply manifold mounted within the cab adjacent the access port thereof;
the manifold having plural inlets in fluid communication with the hydraulic supply source, and having a return line to a system reservoir;
the manifold having a by-pass sump therein;
a plurality of outlet fittings on the manifold;
the manifold having passageways therein connecting the fittings with the fluid inlets;
means normally blocking the passageways;
hitch means connecting the prime mover and the implement;
a console on the implement, the console including fluid conduits connected to the manifold fittings for the transmission of fluid pressure to the motors; and
means on the console to open the means normally blocking the manifold passageways.

11. In a prime mover having a power source, and a plurality of interchangeable work implements, connection and power supply means comprising:
a power supply manifold mounted on the prime mover;
the manifold having a plural contact means thereon in power supply communication with the power source of the prime mover;
the contact means including a series of abutment index elements each controlling a power supply circuit;
means normally maintaining the contact means in a first, non-operating position blocking the transfer of power from the power source therethrough;
hitch means connecting the prime mover and a selected work implement;
a console on each implement, each console having a plurality of power conduits in accordance with the power requirements of the selected implement;
each console including a set of index points, the index points in the set associated with a defined implement being arranged differently from the index points associated with the other work implements, the index points of each set contacting the related abutment index elements of the contact means to activate solely the circuit requirements of the defined implement when said implement is secured to the prime mover through said hitch means; and
the contact of the index elements and points opening the means normally maintaining the contact means in said non-operating position to move said means to a second, operating position permitting power flow therethrough.

12. The invention of claim 11, wherein:
the hitch means includes interlocking jaws on the power means with restraining means connected thereto;
the jaws being pivoted to one another;
the jaws being extensible to an outer extent greater than that of the restraining means whereby the jaws are opened responsive to extension thereof; and
a pin on the defined implement engaged by the jaws.

13. The invention of claim 11, wherein:
the power supplied by the power source through the manifold comprises pressurized fluid.

14. The invention of claim 11, and:
manual levers on the console to open or close each power conduit for implement operation.

References Cited
UNITED STATES PATENTS

| | | | |
|---|---|---|---|
| 1,973,610 | 9/1934 | Connors | 280—421 |
| 2,062,806 | 12/1936 | Casler | 280—421 |
| 2,180,048 | 11/1939 | Gurton et al. | 180—14 |
| 2,858,848 | 11/1958 | Wittren | 180—421 X |

A. HARRY LEVY, *Primary Examiner.*